(12) United States Patent
Vaidyanathan (10) Patent No.: US 7,594,108 B2
(45) Date of Patent: Sep. 22, 2009

(54) OPERATOR ROOT CERTIFICATES

(75) Inventor: Krishnan Vaidyanathan, Tampere (FI)

(73) Assignee: Nokia Corporation, Espoo (FI)

( * ) Notice: Subject to any disclaimer, the term of this patent is extended or adjusted under 35 U.S.C. 154(b) by 581 days.

(21) Appl. No.: 10/981,415

(22) Filed: Nov. 3, 2004

(65) Prior Publication Data

US 2005/0125661 A1    Jun. 9, 2005

(51) Int. Cl.
| | |
|---|---|
| H04L 29/06 | (2006.01) |
| H04L 9/32 | (2006.01) |
| G06F 21/00 | (2006.01) |
| G06F 12/14 | (2006.01) |
| G06F 7/04 | (2006.01) |
| H04K 1/00 | (2006.01) |
| G06F 9/44 | (2006.01) |
| G06F 9/445 | (2006.01) |

(52) U.S. Cl. ............... 713/157; 713/165; 713/168; 713/173; 713/176; 713/185; 713/187; 713/193; 726/9; 726/27; 726/30; 380/270; 717/103; 717/126; 717/127; 717/176; 717/178

(58) Field of Classification Search ............... 713/157
See application file for complete search history.

(56) References Cited

U.S. PATENT DOCUMENTS

| 6,005,942 A | 12/1999 | Chan et al. ............... 380/25 |
| 6,233,683 B1 | 5/2001 | Chan et al. ............... 713/172 |
| 6,591,095 B1 * | 7/2003 | Palaniswamy et al. ...... 455/411 |
| 2002/0040936 A1 | 4/2002 | Wentker et al. ............ 235/492 |
| 2004/0199787 A1 * | 10/2004 | Hans et al. ............... 713/200 |
| 2005/0164738 A1 * | 7/2005 | Liu ............... 455/558 |
| 2005/0257209 A1 * | 11/2005 | Adams et al. ............... 717/168 |
| 2007/0118729 A1 * | 5/2007 | Adams et al. ............... 713/1 |
| 2009/0061840 A1 * | 3/2009 | Fleischman et al. ......... 455/419 |
| 2009/0064055 A1 * | 3/2009 | Chaudhri et al. ............ 715/863 |

FOREIGN PATENT DOCUMENTS

| WO | WO 03/096238 | 11/2003 |
| WO | WO 2004/015553 | 2/2004 |

OTHER PUBLICATIONS

Kolsi et al, MIDP 2.0 security enhancements, 2004, IEEE, pp. 18.*
Park et al, User Authentication Mechanism Using Java Card for Personalized IPTV Services, 2008, IEEE, pp. 618-626.*
"Mobile Information Device Profile", for Java™ 2 Micro Edition, Version 2.0, by JSR 118 Expert Group, 566 pages.

* cited by examiner

*Primary Examiner*—William R Korzuch
*Assistant Examiner*—Aravind K Moorthy (57) ABSTRACT

When an application is loaded into a device (100, 200), the device verifies that the application originates from a trusted operator. The verification implies that the application must, in a secure manner, present itself to the device in such a way that the device can ensure that it originates from the trusted operator. The device identifies the trusted operator as well as the issuer of a SIM (211) located in the device. Thereafter, the device compares the identity of the trusted operator with the identity of the issuer of the SIM, and if the identity of the trusted operator corresponds to the identity of the issuer of the SIM, the previously verified application is installed in a secure execution environment (104, 204, 211) of the device.

19 Claims, 4 Drawing Sheets

Fig. 4 ately, since many operators yet do not have SIMs provided with operator root certificates, the operator domain must be disabled if the operator root certificate is not stored elsewhere in the device. Typically, because many operators do not yet have SIMs provided with operator root certificates due to cost aspects, the operator root certificates are stored in the device, outside the SIM. It is desirable that, even though the operator root certificate of a specific operator is stored in the device and an application signed by the operator arrives at the device, the signed application is installed in the secure execution environment of the device only if the SIM located in the device has been issued by the specific operator.

OPERATOR ROOT CERTIFICATES

TECHNICAL FIELD OF THE INVENTION

The present invention relates to a method of controlling installation of applications in a device comprising a secure execution environment to which access is controlled and a communication device comprising a secure execution environment to which access is controlled.

BACKGROUND ART

Various electronic devices, e.g. mobile telecommunication terminals, portable computers and PDAs, require access to security related components such as application programs, cryptographic keys, cryptographic key data material, intermediate cryptographic calculation results, passwords, authentication means for externally downloaded data etc. It is often necessary that these components, and the processing of them, is kept secret within the electronic device. Ideally, they shall be known by as few people as possible since a device possibly can be tampered with if its security related components are known. Access to these types of components might aid an attacker which has a malicious intent to manipulate a terminal.

Therefore, a secure execution environment is introduced in which environment a processor within the electronic device is able to access the security related components. Access to the secure execution environment, processing in it and exit from it should be carefully controlled. Prior art hardware comprising this secure environment is often enclosed within a tamper resistant packaging. It should not be possible to probe or perform measurements and tests on this type of hardware which could result in the revealing of security related components and the processing of them.

The "Mobile Information Device Profile" for Java™ 2 Micro Edition, Version 2.0, by the JSR 118 Expert Group, hereinafter referred to as MIDP 2.0, defines an enhanced architecture and associated application program interfaces (APIs) required to enable an open, third-party, application development environment for mobile information devices (MIDs). Examples of MIDs include cellular phones, two-way pagers, and wireless-enabled PDAs. If a device determines that an MID application can be trusted, then access is allowed as indicated by security policy of the device. Signed applications may become trusted by authenticating the signer of the applications.

A device complying with the MIDP 2.0 assigns applications to different protection domains depending on the source of the application. These protection domains are employed to differentiate between downloaded applications based on the signer of the downloaded application. The MIDP 2.0 defines four different protection domains to be used depending on the signer of the application, namely the manufacturer domain, the operator domain, the third-party domain and the untrusted domain, and each domain has its own security policy. Once an application is downloaded to the device, the device implementation determines to which domain the application belongs, based on a public key infrastructure (PKI) authentication scheme. Each protection domain in the device holds a root certificate to which the application is authenticated, and a domain binds a root certificate to a set of permissions. The permissions are specified in the protection domain security policy.

A trusted operator root certificate is used to verify applications emanating from an operator. This operator root certificate is stored at a specific location in a smart card, being for example a SIM, a WIM or a USIM, of the device, and there is no explicit limitation on the number of operator root certificates which can be stored in the card. However, if an operator root certificate is not available at the specified location in e.g. the SIM, the operator domain must be disabled. Alternatively, since many operators yet do not have SIMs provided with operator root certificates, the operator domain must be disabled if the operator root certificate is not stored elsewhere in the device. Typically, because many operators do not yet have SIMs provided with operator root certificates due to cost aspects, the operator root certificates are stored in the device, outside the SIM. It is desirable that, even though the operator root certificate of a specific operator is stored in the device and an application signed by the operator arrives at the device, the signed application is installed in the secure execution environment of the device only if the SIM located in the device has been issued by the specific operator.

A problem in the prior art related to the implementation of operator domains in devices is that, since different operator root certificates are stored in the device in the manufacturing phase, a signed application from a specific operator may be successfully authenticated at and installed in the secure execution environment of the device, if the operator root certificate of the specific operator is stored in the device. Clearly, this violates the MIDP 2.0 specification and is not in line with the security framework of the specification.

SUMMARY OF THE INVENTION

An object of the present invention is thus to solve the above given problem and provide a solution in which a signed application is successfully installed in the secure execution environment of the device only if the operator root certificate which corresponds to the signed application has been issued by the same operator who has issued the smart card, being for example a SIM, located in the device.

This object is solved by a method of controlling installation of applications in a communication device comprising a secure execution environment to which access is controlled according to the description below and a communication device comprising a secure execution environment to which access is controlled according also to the description that follows.

According to a first aspect of the invention, a method is provided in which an application is loaded into the communication device. The communication device verifies that the application originates from a trusted operator, identifies the trusted operator and the issuer of a smart card located in the communication device. Further, the communication device compares the identity of the trusted operator with the identity of the issuer of the smart card and installs, in the secure execution environment of the communication device, the verified application if the identity of the trusted operator corresponds to the identity of the issuer of the smart card.

According to a second aspect of the invention, a communication device is provided, which device comprises means arranged to load an application into the communication device, to verify that the application originates from a trusted operator, to identify the trusted operator and the issuer of a smart card located in the communication device, to compare the identity of the trusted operator with the identity of the issuer of the smart card; and to install, in the secure execution environment, the verified application if the identity of the trusted operator corresponds to the identity of the issuer of the smart card.

The basic idea of the invention is that when an application arrives at and is loaded into the device, e.g. a mobile telecommunication terminal, a PDA or a portable computer, the device verifies that the application originates from a trusted operator. A trusted operator is an operator which is authorized by the device, or the device manufacturer, to provide applications to the device, i.e. the operator and the device manufacturer have mutual confidence in each other. The verification implies that the application must, in a secure manner, ensure the device that it originates from the trusted operator. The device identifies the trusted operator as well as the issuer of a smart card, e.g. a SIM, located in the device. Thereafter, the device compares the identity of the trusted operator with the identity of the issuer of the SIM, and if the identity of said trusted operator corresponds to the identity of the issuer of the SIM, the previously verified application is installed in the secure execution environment of the device. The present invention is advantageous since an operator application loaded into the device, which application has been verified to originate from a trusted operator, will only be installed in the secure execution environment of the device if the SIM card of the device has been issued by the same trusted operator. This is necessary for devices operating under and thereby complying with the MIDP 2.0 specification, as the devices otherwise violate said specification.

According to an embodiment of the present invention, the application which is loaded into the device is signed by the trusted operator. The verification that the application originates from a trusted operator is effected by means of authenticating the signed application to an operator certificate, which certificate implies that the operator is trusted. The signing and authentication of applications is based on the X.509 PKI scheme. The operator certificate corresponds to the signed application, it is stored in the device and has been issued by the trusted operator. This embodiment brings a high level of security to the installation of applications.

According to further embodiments of the present invention, the identification of the trusted operator is performed at the device by extracting a first operator identifier which identifies the trusted operator from the operator certificate. Moreover, the identification of the issuer of a smart card located in the device is performed by extracting a second operator identifier which identifies the issuer from the international mobile subscriber identity (IMSI) code of the smart card, i.e. the specific operator ID which is present in the IMSI code. This is a straightforward and smooth way of obtaining the respective identifications.

According to another embodiment of the invention, the mechanism for performing the authentication of the signed application, the checking whether the device SIM complies with the specific operator root certificate and the installation of the authenticated application comprises a microprocessor implemented in the device, which microprocessor executes a Java implementation. This embodiment is advantageous since it brings flexibility to the device. If the operation of the microprocessor, and thereby the device, needs to be modified or altered, this can be done by modifying the Java implementation. Consequently, no changes need to be made in actual device hardware. Moreover, the MIDP 2.0 specification is directed to a platform such as a machine-independent software platform on which Java is implemented.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The present invention will be described in greater detail with reference to the following drawings, in which.

DESCRIPTION OF PREFERRED EMBODIMENTS OF THE INVENTION

Figure 1:
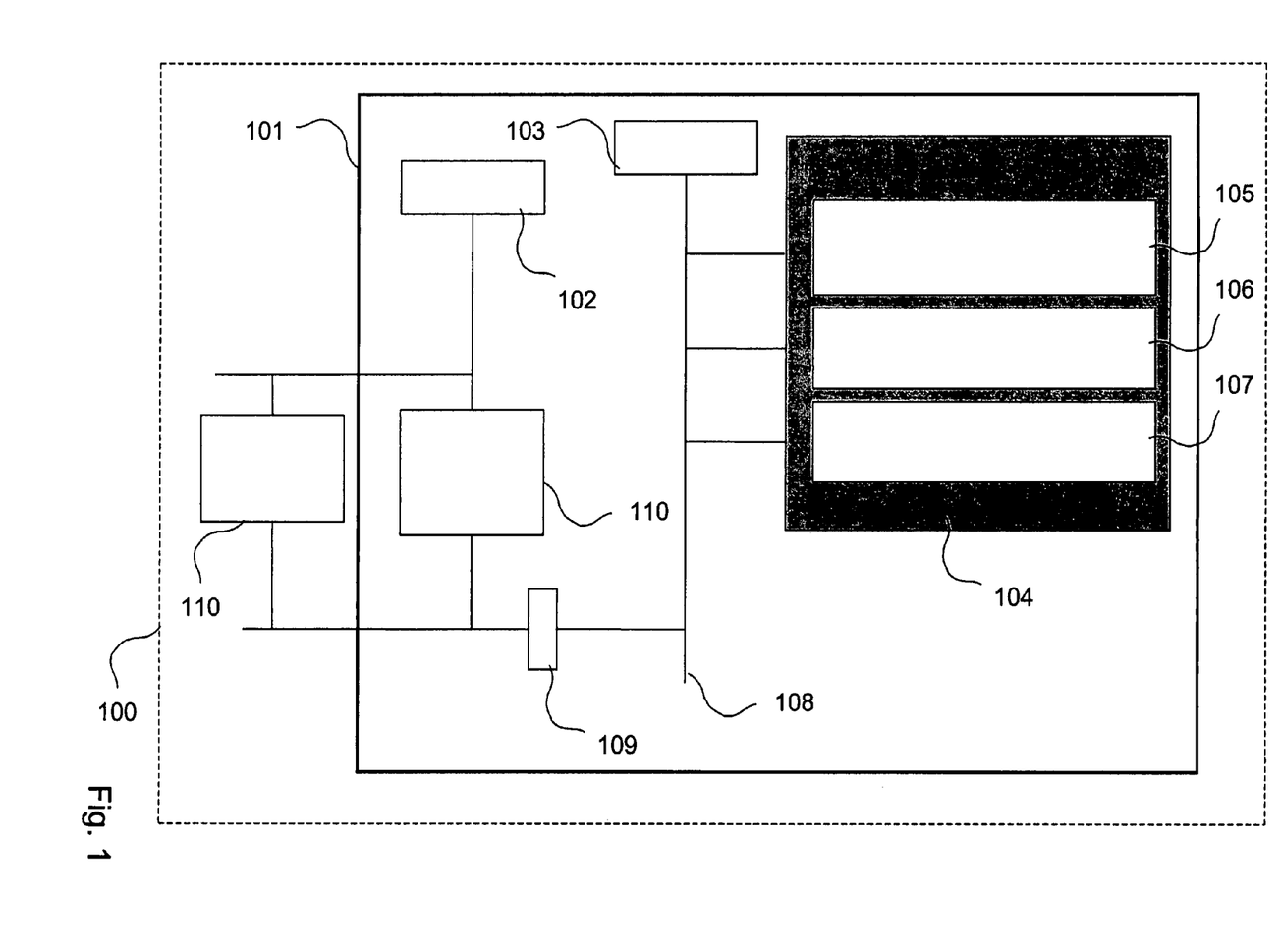
FIG. 1 shows a block diagram of a device architecture for providing data security in which architecture the present invention advantageously can be applied.

A device architecture for providing data security complying with the MIDP 2.0 specification is shown in FIG. 1. Such a system is further disclosed in the Applicant's international patent application PCT/IB02/03216, which application is incorporated herein by reference. Circuitry for providing data security is implemented in the form of an ASIC (Application Specific Integrated Circuit) 101. The processing part of the architecture contains a CPU 103 and a digital signal processor (DSP) 102. The ASIC 101, is included in an electronic appliance 100 such as a mobile telecommunication terminal, a portable computer, a PDA etc. and is considered to be the "brain" of the appliance 100.

The secure environment 104 comprises a computer readable medium such as ROM 105 from which the ASIC 101 is booted. This ROM 105 contains boot application software and an operating system. Certain application programs residing in the secure environment 104 has precedence over other application programs. In a mobile telecommunication terminal, in which the ASIC 101 can be arranged, a boot software should exist, which software includes the main functionality of the terminal. It is not possible to boot the terminal to normal operating mode without this software. This has the advantage that by controlling this boot software, it is also possible to control the initial activation of each terminal.

The secure environment 104 also comprises a computer readable medium such as RAM 106 for storage of data and applications, i.e. protected data. The RAM 106 preferably stores so called protected applications, which are smaller size applications for performing security critical operations inside the secure environment 104, but also objects such as cryptographic keys, intermediate cryptographic calculation results and passwords. Normally, the way to employ protected applications is to let "normal" applications request services from a certain protected application. New protected applications can be downloaded into the secure environment 104 at any time, which would not be the case if they would reside in ROM. Secure environment 104 software controls the download and execution of protected applications. Only signed protected applications are allowed to run. The protected applications can access any resources in the secure environment 104 and they can also communicate with normal applications for the provision of security services.

In an embodiment of the invention, the secure environment software comprises Java implementations, as Java is the language used under the MIDP 2.0 specification. For the device to function satisfactorily outside the scope of MIDP 2.0, any suitable language can be used for implementing the required functionality.

In the secure environment 104, a fuse memory 107 is comprised containing a unique random number that is generated and programmed into the ASIC 101 during manufacturing. This random number is used as the identity of a specific ASIC 101 and is further employed to derive keys for cryptographic operations. Further, storage circuit access control means in the form of a security control register is arranged in the secure environment 104. The purpose of the security control register is to give the CPU 103 access to the secure environment 104, or preventing the CPU 103 from accessing the secure environment 104, depending on the mode set in the register. Operating modes for the CPU 103 can be set in the register by application software, resulting in the fact that the architecture does not have to rely on external signals. From a security viewpoint, this is preferable since by controlling the application software, the setting of processor modes can also be controlled. It is also possible to have an external signal (not shown) connected to the ASIC 101, by which signal it is possible to set the security control register. By using an external signal, a mode change can be executed easily and quickly, which can be advantageous in test environments. A combination of these two mode setting means, i.e. application software as well as external signals, is feasible.

The architecture further comprises a standard bridge circuit 109 for limitation of data visibility on the bus 108. The architecture should be enclosed within a tamper resistant packaging. It should not be possible to probe or perform measurements and tests on this type of hardware which could result in the revealing of security related components and the processing of them. The DSP 102 has access to other peripherals 110 such as a direct memory access (DMA) unit, RAMs, flash memories and additional processors can be provided outside the ASIC 101.

Figure 2:
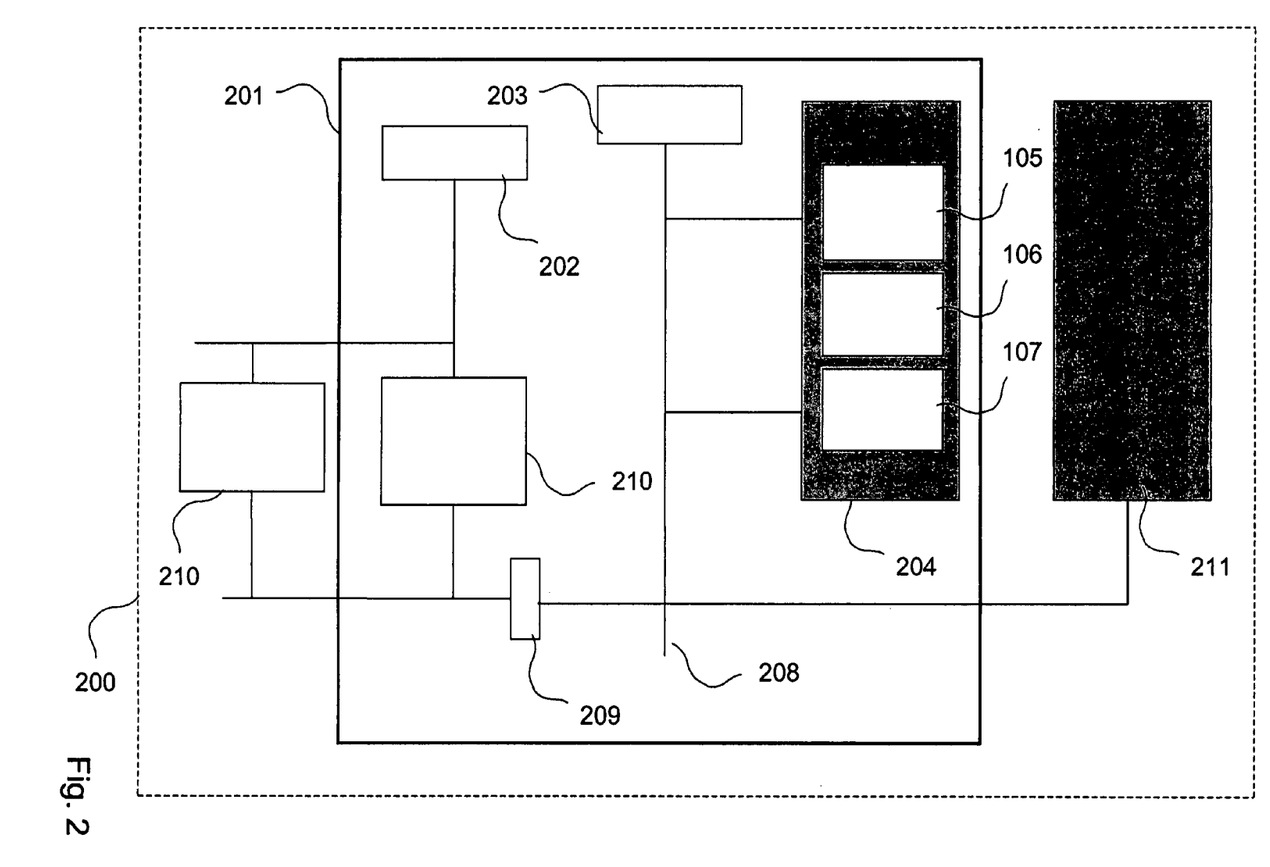
FIG. 2 shows a block diagram of the device architecture for providing data security, further arranged with a removable smart card, in which architecture the present invention advantageously can be applied.

Another embodiment of the device architecture for providing data security is shown in FIG. 2, wherein corresponding reference numerals denote corresponding elements as described in connection to FIG. 1. The difference in the architecture shown in FIG. 2, as compared to the architecture illustrated in FIG. 1, is that the electronic appliance 200 is arranged with a removable smart card 211, for example a SIM, which is also considered a secure environment. For security purposes, the mobile terminal 200 and the smart card 211 store digital certificates issued by trusted certification authorities (CAs). Certificates are used to ensure actors communicating with the electronic appliance, e.g., a mobile terminal 200 and/or the smart card 211 that the holder of a specific certificate has been authorized by the corresponding trusted CA. The CA signs the certificate, and the certificate holder must be in possession of the public key that corresponds to the private key of the CA to verify that a certificate signed by the CA is valid. Note that different devices can hold certificates from different CAs. In that case, the different CAs must perform some communication with one another, for example exchange their own public keys. Certificates are well known for those skilled in the art, and a well known standard certificate are the certificate contained in the CCITT recommendation X.509.

In accordance with the MIDP 2.0 specification, certificates can be issued by various CAs. That is, trusted manufacturers issue manufacturer root certificates, trusted operators issue operator root certificates and trusted third parties issue third party root certificates. As these certificates are security related components, the certificates themselves are stored in the secure environment and security related processing of them is also performed in the secure environment. An untrusted application is an application which is not signed, or which is not provided with a similar trusted identifier, and which therefore cannot be trusted by the device. A cautious approach must be adopted when running untrusted applications. They must be executed outside the secure execution environment and they cannot be given full access to security components. As an alternative, they are not allowed to exchange information across the secure environment interface. As another alternative, wherein a stricter procedure is practiced, untrusted applications are not at all allowed to be installed in the device.

Figure 3:
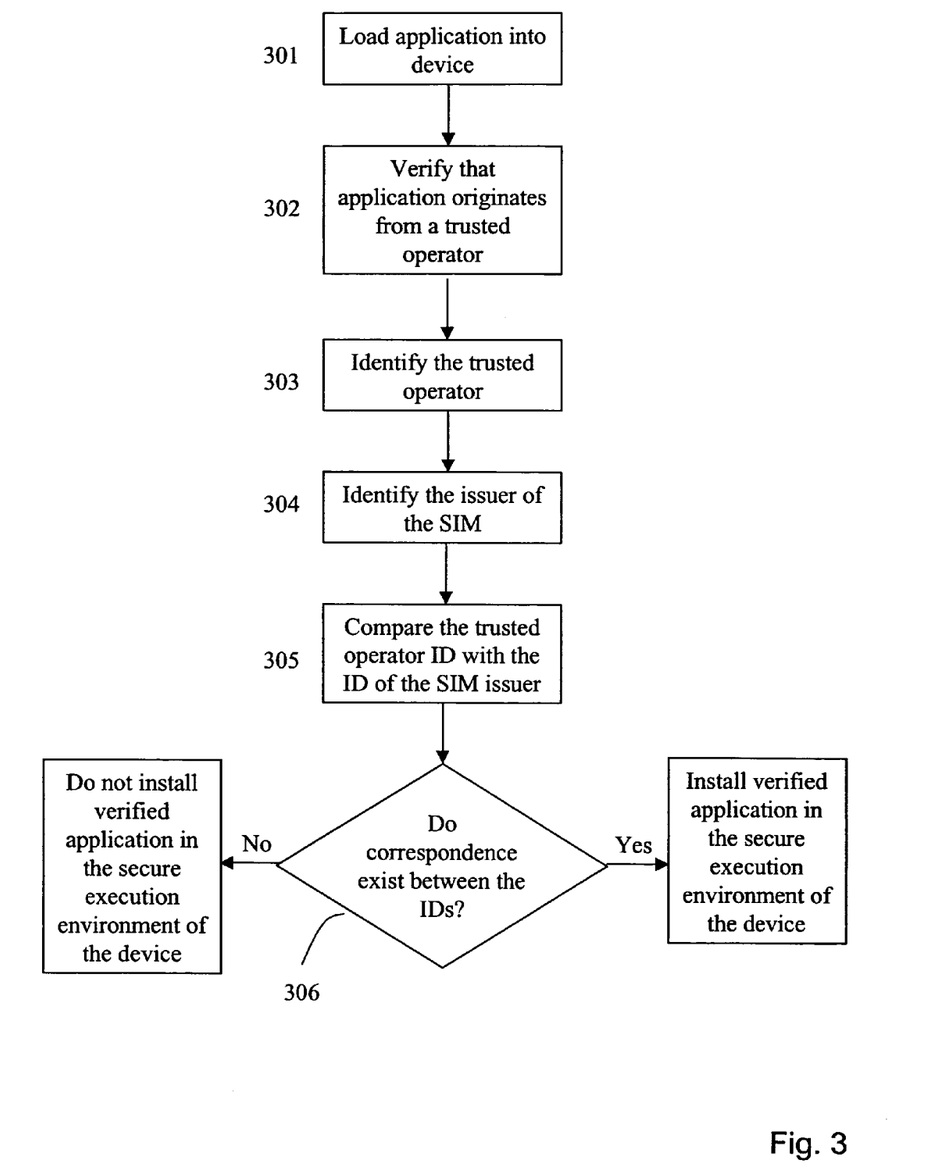
FIG. 3 shows a flow chart for controlling installation of applications in a device comprising a secure execution environment, in accordance with an embodiment of the present invention.

A method of controlling installation of applications in the secure execution environment of a device according to an embodiment of the invention is shown in FIG. 3. In step 301, an application provided with some type of assurance that the application actually originates from a trusted operator, i.e. a protected application, is loaded into the device. Then, in step 302, the CPU of the device verifies that the application originates from a trusted operator by means of analyzing said assurance. In step 303, when the application has been verified, the CPU identifies the trusted operator from which the application originates. The method continues to step 304, where the issuer of a smart card, e.g. a SIM, located in the communication device is identified. In step 305, the CPU compares the identity of the trusted operator with the identity of the issuer of the SIM to check for correspondence between the two identities. In step 306, if the identity of the trusted operator corresponds to identity of the issuer of the SIM, i.e. the issuer of the SIM has also issued the application, the verified application is installed in the secure execution environment of the device. However, if in step 306, the identity of the trusted operator does not correspond to the identity of the issuer of the SIM, i.e. the issuer of the SIM has not issued the verified application, the verified application will not be installed in the secure execution environment of the device.

Note that, at step 306, since the verified application has been authenticated, it can be installed outside the secure execution environment of the device, even though the issuer of the SIM has not issued the application. Accordingly, as described hereinabove, it will be given a limited access to security related components. Alternatively, if the identity of the trusted operator does not correspond to the identity of the issuer of the SIM, the verified application will not be installed in the device at all.

Figure 4:
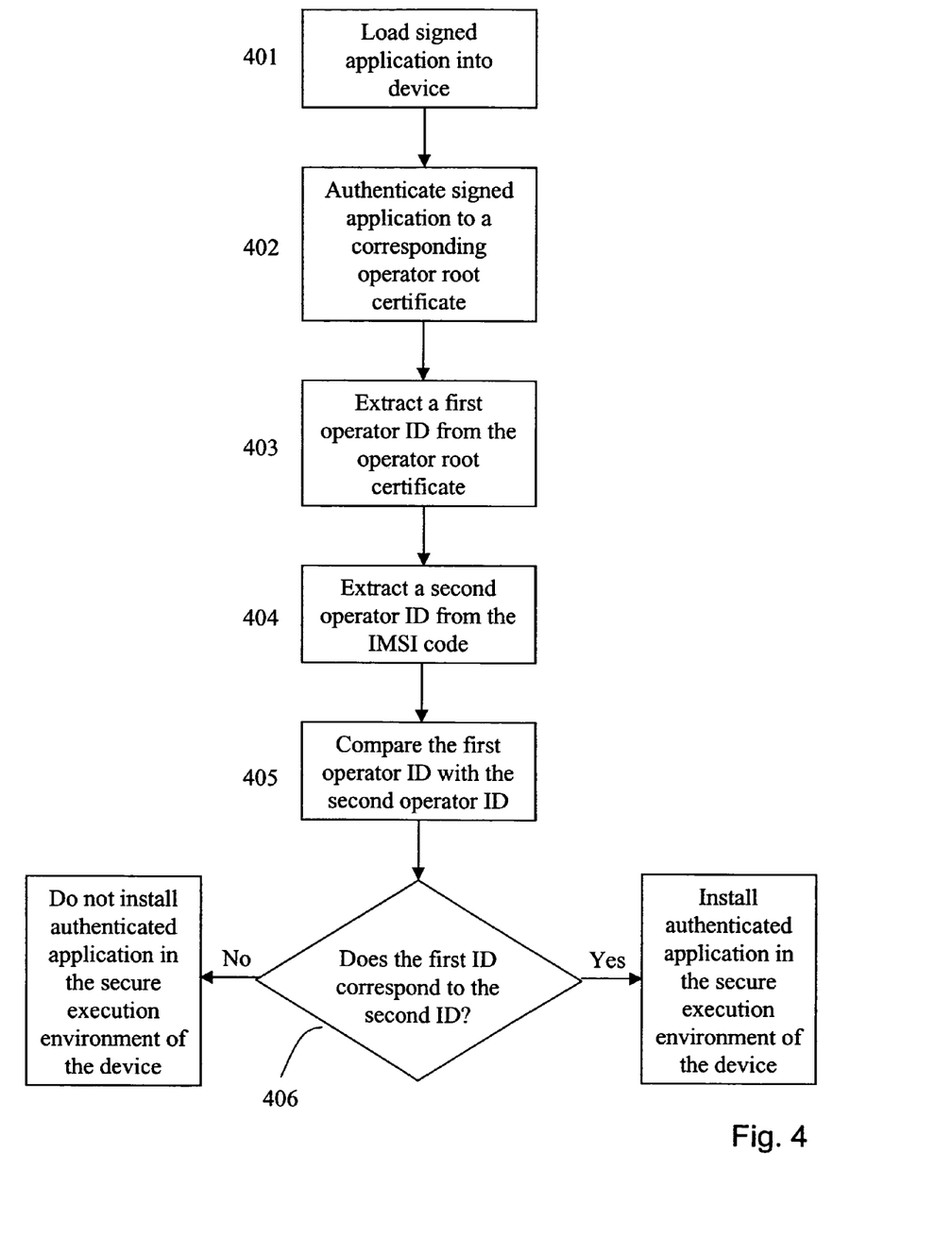
FIG. 4 shows a flow chart for controlling installation of applications in a device comprising a secure execution environment, in accordance with another embodiment of the present invention.

A method of controlling installation of applications in the secure execution environment of a device according to another embodiment of the invention is shown in FIG. 4. In step 401, a signed application, i.e. a protected application, is loaded into the device. Then, in step 402, the CPU of the device authenticates the signed application to an operator root certificate stored in the device. This operator root certificate has been issued by a trusted operator being the same operator which signed the application. Thus, the certificate contains the public key which corresponds to the private key which has been used by the trusted operator to sign the application. Note that in the description related to FIG. 4, it is assumed that (i) the application actually is signed and (ii) the device holds the operator root certificate which corresponds to the signed application. In the case that the application is not signed, i.e. it is untrusted, the method will terminate after step 402, as no authentication of the application is possible. Optionally, the untrusted application may be installed outside the secure execution environment of the device, as previously described. In the case where the device does not hold the operator root certificate, the method will also terminate after step 402, as no authentication of the application is possible.

In step 403, when the signed application has been authenticated to the operator root certificate, the CPU extracts a first operator identifier from the operator certificate. This first identifier identifies the trusted operator having issued the operator root certificate. The method continues to step 404, where a second operator identifier is extracted from the IMSI code of the SIM located in the device. This second identifier identifies the issuer of the SIM. In step 405, the CPU compares the first operator identifier with the second operator identifier to check for correspondence between the two identifiers. In step 406, if the first operator ID corresponds to the second operator ID, i.e. the issuer of the SIM has also signed the application, the authenticated application is installed in the secure execution environment of the device. However, if in step 406, the first operator ID does not correspond to the second operator ID, i.e. the issuer of the SIM has not signed the application, the authenticated application will not be installed in the secure execution environment of the device. Note that, at step 406, since the signed application has been authenticated, it can be installed outside the secure execution environment of the device, even though the issuer of the SIM has not signed the application. Accordingly, as described hereinabove, it will be given a limited access to security related components. Again, if the identity of the trusted operator does not correspond to the identity of the issuer of the SIM, the verified application will alternatively not be installed in the device at all.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method comprising:
   loading an application into a communication device;
   verifying, at the communication device, that the application originates from a trusted operator;
   identifying, at the communication device, said trusted operator;
   identifying, at the communication device, an issuer of a smart card located in the communication device;
   comparing, at the communication device, the identity of said trusted operator with the identity of the issuer of the smart card; and
   installing, in a secure execution environment of the communication device, the verified application if the identity of said trusted operator corresponds to the identity of the issuer of the smart card.

2. The method according to claim 1, wherein the application which is loaded into the communication device is signed by said trusted operator and the step of verifying that the application originates from a trusted operator comprises:
   authenticating the signed application to an operator certificate which corresponds to said signed application, which operator certificate is stored in the communication device and has been issued by the trusted operator.

3. The method according to claim 2, wherein the step of identifying said trusted operator comprises:
   extracting a first operator identifier from the operator certificate, which first identifier identifies said trusted operator.

4. The method according to claim 1, wherein the step of identifying the issuer of a smart card located in the communication device comprises:
   extracting a second operator identifier from an identity code of said smart card, which second identifier identifies the operator having issued the smart card.

5. The method according to claim 4, wherein said identity code comprises an international mobile subscriber identity code.

6. The method according to claim 1, wherein said steps are performed by a microprocessor executing a Java implementation, which microprocessor is comprised in the communication device.

7. The method according to claim 1, wherein the communication device is a mobile telecommunication terminal.

8. The method according to claim 1, wherein the smart card is a subscriber identity module, a wireless application protocol identity module or a universal subscriber identity module.

9. The method according to claim 1, wherein the communication device comprises circuitry for providing data security, which circuitry contains at least one processor and at least one storage circuit and which circuitry comprises:
   at least one storage area in said storage circuit, in which storage area protected data relating to communication device security are located;
   mode setting means arranged to set said processor in one of at least two different operating modes, the mode setting means being capable of altering the processor operating mode;
   storage circuit access control means arranged to enable said processor to access said storage area in which said protected data are located when a first processor operating mode is set; and
   storage circuit access control means arranged to prevent said processor from accessing said storage area in which protected data are located when a second processor operating mode is set.

10. A computer-readable medium storing computer-executable components for causing a device to perform the steps recited in claim 1 when the computer-executable components are run on a processing unit included in the device.

11. A communication device comprising
   a secure execution environment to which access is strictly controlled; and:
   a processor arranged to load an application into the communication device, to verify that the application originates from a trusted operator, to identify said trusted operator and the issuer of a smart card located in the communication device, to compare the identity of said trusted operator with the identity of the issuer of the smart card, and to install, in the secure execution environment, the verified application if the identity of said trusted operator corresponds to the identity of the issuer of the smart card.

12. The communication device according to claim 11, wherein the application which is loaded into the communication device is signed by said trusted operator and the processor is further arranged to authenticate the signed application to an operator certificate which corresponds to said signed application, which operator certificate is stored in the communication device and has been issued by the trusted operator.

13. The communication device according to claim 12, wherein the processor is further arranged to extract a first operator identifier from the operator certificate, which first identifier identifies said trusted operator.

14. The communication device according to claim 11, wherein the processor is further arranged to extract a second operator identifier from an identity code of said smart card, which second identifier identifies the operator having issued the smart card.

15. The communication device according to claim 14, wherein said identity code comprises an international mobile subscriber identity code.

16. The communication device according to claim 11, wherein said means is implemented by a microprocessor executing an implementation of a machine-independent software platform.

17. The communication device according to claim 11, wherein the communication device is a mobile telecommunication terminal.

18. The communication device according to claim 11, wherein the smart card is a subscriber identity module, a wireless application protocol identity module or a universal subscriber identity module.

19. The communication device according to claim 11, wherein the communication device comprises circuitry for providing data security, which circuitry contains at least one processor and at least one storage circuit and which circuitry comprises:

at least one storage area in said storage circuit, in which storage area protected data relating to circuitry security are located;

mode setting means arranged to set said processor in one of at least two different operating modes, the mode setting means being capable of altering the processor operating mode;

storage circuit access control means arranged to enable said processor to access said storage area in which said protected data are located when a first processor operating mode is set; and storage circuit access control means arranged to prevent said processor from accessing said storage area in which protected data are located when a second processor operating mode is set.

* * * * *

UNITED STATES PATENT AND TRADEMARK OFFICE
CERTIFICATE OF CORRECTION

PATENT NO.       : 7,594,108 B2                                   Page 1 of 1
APPLICATION NO.  : 10/981415
DATED            : September 22, 2009
INVENTOR(S)      : Krishnan Vaidyanathan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Twenty-eighth Day of September, 2010

David J. Kappos
*Director of the United States Patent and Trademark Office*